(12) United States Patent
Kim et al.

(10) Patent No.: US 12,400,356 B2
(45) Date of Patent: Aug. 26, 2025

(54) ELECTRONIC DEVICE, METHOD, AND COMPUTER READABLE STORAGE MEDIUM FOR OBTAINING VIDEO SEQUENCE INCLUDING VISUAL OBJECT WITH POSTURES OF BODY INDEPENDENTLY FROM MOVEMENT OF CAMERA

(71) Applicants: NCSOFT CORPORATION, Seongnam-si (KR); KWANGWOON UNIVERSITY INDUSTRY-ACADEMIC COLLABORATION FOUNDATION, Seoul (KR)

(72) Inventors: Seonghyun Kim, Seoul (KR); Sungbum Park, Seongnam-si (KR); Sangjun Ahn, Seongnam-si (KR); Juyong Chang, Seoul (KR); Sunwon Jeong, Seongnam-si (KR)

(73) Assignees: NCSOFT CORPORATION, Seongnam-si (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 508 days.

(21) Appl. No.: 17/738,394

(22) Filed: May 6, 2022

(65) Prior Publication Data
US 2022/0375119 A1 Nov. 24, 2022

(30) Foreign Application Priority Data
May 7, 2021 (KR) ........................ 10-2021-0059552

(51) Int. Cl.
G06K 9/00 (2022.01)
G06T 7/246 (2017.01)
G06T 7/73 (2017.01)

(52) U.S. Cl.
CPC ................ G06T 7/73 (2017.01); G06T 7/246 (2017.01); G06T 2207/10016 (2013.01); G06T 2207/10024 (2013.01); G06T 2207/30196 (2013.01)

(58) Field of Classification Search
CPC ............ G06T 7/73; G06T 2207/10016; G06T 2207/30196; G06T 7/246; G06T 2207/10024; G06V 2201/033
See application file for complete search history.

(56) References Cited

U.S. PATENT DOCUMENTS

| 8,355,529 B2 * | 1/2013 | Wu ........................ G06T 7/251 382/103 |
| 8,365,153 B2 | 1/2013 | Chen et al. |

(Continued)

FOREIGN PATENT DOCUMENTS

| CN | 108304064 A | * | 7/2018 | |
| CN | 106621284 B | * | 8/2018 | ........... A61B 5/1118 |

(Continued)

OTHER PUBLICATIONS

Xiang et al., Monocular Total Capture: Posing Face, Body, and Hands in the Wild, Dec. 4, 2018 (Year: 2018).*

(Continued)

Primary Examiner — Jayesh A Patel
(74) Attorney, Agent, or Firm — Sughrue Mion, PLLC

(57) ABSTRACT

The electronic device according to various embodiments include a memory configured to store instructions and at least one processor configured, when executing the instructions, to obtain a first video sequence including a visual (Continued)

object corresponding to a body; obtain a local posture sequence of the visual object that indicates postures of at least one visual element of the visual object in the first video sequence, the at least one visual element of the visual object corresponding to at least one joint of the body; obtain a global motion sequence of the visual object, based on a difference between the postures of the at least one visual element, the postures of the at least one visual object obtained by using the local posture sequence; and obtain a second video sequence, based on the local posture sequence and the global motion sequence.

18 Claims, 8 Drawing Sheets

(56) References Cited

U.S. PATENT DOCUMENTS

| | | | | |
|---|---|---|---|---|
| 8,505,001 | B2 | 8/2013 | Upton | |
| 9,792,689 | B2* | 10/2017 | Shiozaki | G06T 7/75 |
| 10,861,170 | B1* | 12/2020 | Li | G06T 7/73 |
| 10,885,708 | B2* | 1/2021 | Guay | G06T 7/75 |
| 10,929,654 | B2* | 2/2021 | Iqbal | G06N 3/08 |
| 10,984,575 | B2* | 4/2021 | Assouline | G06N 3/08 |
| 11,036,989 | B1* | 6/2021 | Assouline | G06V 40/103 |
| 11,450,051 | B2* | 9/2022 | Assouline | G06T 13/40 |
| 2017/0213320 | A1* | 7/2017 | Yücer | G06T 7/579 |
| 2019/0320113 | A1* | 10/2019 | Rajvanshi | H04N 23/64 |

FOREIGN PATENT DOCUMENTS

| | | | | |
|---|---|---|---|---|
| CN | 108629801 A | * | 10/2018 | G06T 7/55 |
| CN | 111510665 A | * | 8/2020 | G06V 40/20 |
| CN | 111582220 A | * | 8/2020 | G06K 9/00335 |
| CN | 112132136 A | * | 12/2020 | |
| CN | 112738409 B | * | 8/2024 | G06T 7/11 |
| DE | 112009004276 T5 | * | 10/2012 | G06T 7/0065 |
| WO | WO-2014012123 A1 | * | 1/2014 | G06K 9/00342 |

OTHER PUBLICATIONS

Mehta et al., VNect: Real-time 3D Human Pose Estimation with a Single RGB Camera, Mar. 5, 2017 (Year: 2017).*
Wei et al., Human skeleton tree recurrent neural network with joint relative motion feature for skeleton based action recognition, Sep. 20, 2017 (Year: 2017).*
Automatic Tracking of Human Motion in Indoor Scenes Across Multiple Synchronized Video Streams, Q. Gai et al., 1998, pp. 356-362 (Year: 1998).*
Human skeleton tree recurrent neural network with joint relative motion feature for skeleton based action recognition, Shenghua Wei et al., IEEE, 2017, pp. 91-95 (Year: 2017).*
Detecting abnormal human behaviour using multiple cameras, Panagiota Antonakaki et al., Elsevier, 2009, pp. 1723-1738 (Year: 2009)*
Recovering Accurate 3D Human Pose in The Wild Using IMUs and a Moving Camera, Timo von Marcard et al., CVF, 2018, pp. 1-17 (Year: 2018)*

* cited by examiner

ELECTRONIC DEVICE, METHOD, AND COMPUTER READABLE STORAGE MEDIUM FOR OBTAINING VIDEO SEQUENCE INCLUDING VISUAL OBJECT WITH POSTURES OF BODY INDEPENDENTLY FROM MOVEMENT OF CAMERA

CROSS-REFERENCE TO RELATED APPLICATION(S)

This application is based on and claims priority under 35 U.S.C. § 119 to Korean Patent Application No. 10-2021-0059552, filed on May 7, 2021, in the Korean Intellectual Property Office, the disclosure of which are incorporated by reference herein their entirety.

BACKGROUND

Technical Field

Various embodiments described below relate to an electronic device, a method, and a computer-readable storage medium for obtaining a video sequence comprising a visual object having body postures independent of camera movement.

Description of Related Art

Three dimensional (3D) human posture estimation may be the most important problem in computer vision. In particular, 3D human posture estimation from a monocular image sequence has recently been developed using deep-learning technology.

SUMMARY

In most studies, a three-dimensional (3D) human posture is defined within a camera coordinate system. The 3D human posture defined and estimated within the camera coordinate system may be coupled with the movement of the camera. Since the 3D human posture coupled with the movement of the camera is distinct from the posture of a pure human (or body), a method for estimating a pure human posture independent from the movement of the camera may be required.

The technical problems to be achieved in this document are not limited to those described above, and other technical problems not mentioned herein will be clearly understood by those having ordinary knowledge in the art to which the present disclosure belongs, from the following description.

A computer readable storage medium according to various embodiments may store one or more programs when executed by at least one processor of an electronic device, cause the electronic device to obtain a first video sequence including a visual object corresponding to a body; obtain a local posture sequence of the visual object that indicates postures of at least one visual element of the visual object in the first video sequence, the at least one visual element of the visual object corresponding to at least one joint of the body; obtain a global motion sequence of the visual object, based on a difference between the postures of the at least one visual element, the postures of the at least one visual object obtained by using the local posture sequence; and obtain a second video sequence, based on the local posture sequence and the global motion sequence.

A method for operating an electronic device according to various embodiments may comprise obtaining a first video sequence including a visual object corresponding to a body; obtaining a local posture sequence of the visual object that indicates postures of at least one visual element of the visual object in the first video sequence, the at least one visual element of the visual object corresponding to at least one joint of the body; obtaining a global motion sequence of the visual object, based on a difference between the postures of the at least one visual element, the postures of the at least one visual object obtained by using the local posture sequence; and obtaining a second video sequence, based on the local posture sequence and the global motion sequence.

The electronic device according to various embodiments may comprise a memory configured to store instructions and at least one processor configured, when executing the instructions, to obtain a first video sequence including a visual object corresponding to a body; obtain a local posture sequence of the visual object that indicates postures of at least one visual element of the visual object in the first video sequence, the at least one visual element of the visual object corresponding to at least one joint of the body; obtain a global motion sequence of the visual object, based on a difference between the postures of the at least one visual element, the postures of the at least one visual object obtained by using the local posture sequence; and obtain a second video sequence, based on the local posture sequence and the global motion sequence.

A computer readable storage medium according to various embodiments may store one or more programs when executed by at least one processor of an electronic device, cause the electronic device to obtain, while a camera is moved, a first video sequence including a first image and a second image subsequent to the first image, the first image and the second image obtained through the camera; identify a visual object in the first image corresponding to a body and the visual object in the second image; determine postures of the body independently from the movement of the camera, based on a difference between a posture of at least one visual element of the visual object in the first image corresponding to at least one joint of the body and a posture of at least one visual element of the visual object in the second image corresponding to the at least one joint; and obtain a second video sequence including a new visual object having the determined postures.

A method for operating an electronic device according to various embodiments may comprise obtaining, while a camera is moved, a first video sequence including a first image and a second image subsequent to the first image, the first image and the second image obtained through the camera; identifying a visual object in the first image corresponding to a body and the visual object in the second image; determining postures of the body independently from the movement of the camera, based on a difference between a posture of at least one visual element of the visual object in the first image corresponding to at least one joint of the body and a posture of at least one visual element of the visual object in the second image corresponding to the at least one joint; and obtaining a second video sequence including a new visual object having the determined postures.

The electronic device according to various embodiments may include a memory configured to store instructions and at least one processor configured, when executing the instructions, to obtain, while a camera is moved, a first video sequence including a first image and a second image subsequent to the first image, the first image and the second image obtained through the camera; identify a visual object in the first image corresponding to a body and the visual object in the second image; determine postures of the body independently from the movement of the camera, based on a difference between a posture of at least one visual element of the visual object in the first image corresponding to at least one joint of the body and a posture of at least one visual element of the visual object in the second image corresponding to the at least one joint; and obtain a second video sequence including a new visual object having the determined postures.

The effects that can be obtained from the present disclosure are not limited to those described above, and any other effects not mentioned herein will be clearly understood by those having ordinary knowledge in the art to which the present disclosure belongs, from the following description.

DETAILED DESCRIPTION

Figure 1:
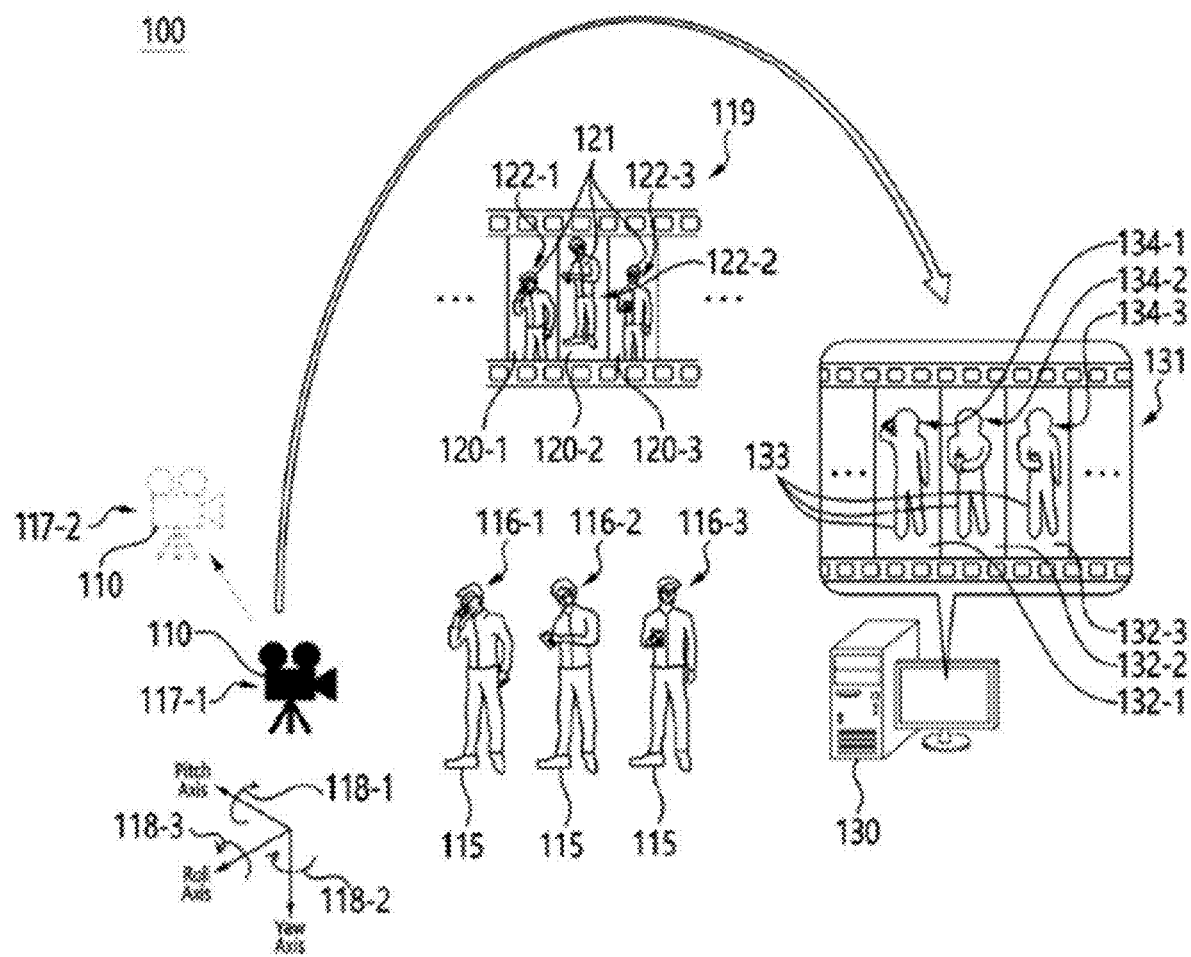
FIG. 1 illustrates an environment comprising an electronic device according to various embodiments.

An electronic device, a method, and a computer-readable storage medium according to various embodiments can obtain data on pure body postures independent of the movement of the camera photographing the body by performing an operation based on the movement of at least one joint of the body.

The electronic device according to various embodiments disclosed in the present document may be various types of devices. The electronic device may comprise, for example, a portable communication device (e.g., a smartphone), a computer device, a portable multimedia device, a portable medical device, a camera, a wearable device, a server, or a home appliance. The electronic device according to an embodiment of the present document is not limited to the above-described devices.

The various embodiments and terms used herein are not intended to limit the technical features described herein to specific embodiments and should be understood to include various modifications, equivalents, or substitutes of the embodiment. With respect to the description of the drawings, similar reference numerals may be used for similar or related components. The singular form of the noun corresponding to the item may include one or more of the items unless clearly indicated differently in a related context. In this document, each of the phrases such as "A or B", "at least one of A and B", "at least one of A or B", "A, B or C", "at least one of A, B and C", and "at least one of A, B or C" may include any one of the phrases together, or all possible combinations thereof. Terms such as "first", "second", or "first", or "second" may be used simply to distinguish a corresponding component from another corresponding component, and are not limited to other aspects (e.g., importance or order). When some (e.g., the first) component is referred to as "coupled" or "connected" in another (e.g., the second) component, with or without the term "functional" or "communicatively", it means that some of the components can be connected directly (e.g., wired), wirelessly, or through a third component.

The term "module" used herein may comprise a unit implemented in hardware, software, or firmware, and may be used interchangeably with terms such as, for example, logic, logic block, component, or circuit. A module may be an integrally formed part or a minimum unit or a part of the part that performs one or more functions. For example, according to an embodiment, the module may be implemented in the form of an application-specific integrated circuit (ASIC).

Various embodiments of the present document may be implemented as software (e.g., a program) including one or more instructions stored in a storage medium readable by a machine (e.g., electronic device 130). For example, the processor of the device (e.g., the electronic device 130) may invoke and execute at least one of one or more commands stored from the storage medium. This makes it possible for the device to be operated to perform at least one function according to the called at least one command. The one or more instructions may comprise code generated by a compiler or code that may be executed by an interpreter. The device-readable storage medium may be provided in the form of a non-transitory storage medium. Here, 'non-transitory' only means that the storage medium is a device that is tangible and does not include a signal (e.g., electromagnetic waves), and the term does not distinguish between a case where data is semi-permanently stored in the storage medium and a case where data is temporarily stored.

According to an embodiment, a method according to various embodiments disclosed in the present document may be comprised and provided in a computer program product. Computer program products may be traded between sellers and buyers as products. The computer program product may be distributed in the form of a device-readable storage medium (e.g., compact disc read-only memory (CD-ROM), or may be distributed online (e.g., download or upload) through an application store (e.g., Play Store™, or App Store™) or directly between two user devices (e.g., smartphones). In the case of online distribution, at least a part of the computer program product may be at least temporarily stored or temporarily generated in a device-readable storage medium such as a memory of a server of a manufacturer, a server of an application store, or a relay server.

According to various embodiments, each component (e.g., a module or program) of the above-described components may comprise a singular or a plurality of objects. According to various embodiments, one or more components or operations among the above-described corresponding components may be omitted, or one or more other components or operations may be added. Alternatively, or additionally multiple components (e.g., modules or programs) may be integrated into one component. In this case, the integrated component may perform one or more functions of each component of the plurality of components identically or similarly to those performed by the corresponding component among the plurality of components before the integration. According to various embodiments, operations performed by a module, program, or other component are executed sequentially, in parallel, repeatedly, or heuristically, or one or more of the operations are executed in a different order, or omitted, or one or more other operations may be added.

FIG. 1 illustrates an environment comprising an electronic device according to various embodiments.

Referring to FIG. 1, the environment 100 may comprise a camera 110 and an electronic device 130.

In various embodiments, the camera 110 may be used to photograph the body 115. In various embodiments, the body 115 may have a plurality of postures while being photographed by the camera 110. For example, the body 115 may have a posture 116-1, a posture 116-2, and a posture 116-3 while being photographed by the camera 110.

In various embodiments, the camera 110 may be moved while photographing the body 115 having the plurality of postures. For example, the movement of the camera 110 may comprise a change in a location of one point (e.g., a center point) of the camera 110 while the orientation of the camera 110 is maintained. For example, the change in the location of one point of the camera 110 may comprise changing the location of the center point of the camera 110 from the location 117-1 to the location 117-2 in a state of maintaining the orientation of the camera 110. However, it is not limited thereto. For example, the movement of the camera 110 may comprise a change in orientation of the camera 110 while a location of one point (e.g., a center point) of the camera 110 is maintained. For example, the change in the orientation of the camera 110 while the location of one point of the camera 110 is maintained, in a state where the location of the center point of the camera 110 is maintained within the location 117-1, may comprise changing the orientation of the camera according to at least one of rotation (118-1) of the pitch axis, rotation (118-2) of the yaw axis, or rotation (118-3) of the roll axis. However, it is not limited thereto. In other words, the movement of the camera 110 may be referred to in this document as a meaning comprising at least one of change of the location of a predefined one point of the camera 110 while maintaining the orientation of the camera 110 or change of the orientation of the camera 110 while maintaining the location of the one point of the camera 110.

In various embodiments, the camera 110 may obtain a video sequence 119 by photographing the body 115 having the plurality of postures. In various embodiments, video sequence 119 may comprise a plurality of images. For example, the plurality of images may comprise a first image 120-1, a second image 120-2 directly next to the first image 120-1, and a third image 120-3 directly next to the second image 120-2. For example, each of the plurality of images may comprise a visual object 121 corresponding to the body 115. For example, the visual object 121 in each of the plurality of images may have each of a plurality of postures in which a posture according to the movement of the camera 110 is applied to each of a plurality of postures of the body 115. For example, the visual object 121 in the first image 120-1 may have a posture 122-1 in which the posture of the camera 110 is applied when acquiring the first image 120-1 to the posture 116-1 of the body 115. For example, the posture of the camera 110 when acquiring the first image 120-1 may be a posture caused by the movement of the camera 110. For another example, the visual object 121 in the second image 120-2 may have a posture 122-2 in which the posture of the camera 110 is applied when acquiring the second image 120-2 to the posture 116-2 of the body 115. For example, the posture of the camera 110 when acquiring the second image 120-2 may be a posture caused by the movement of the camera 110. For another example, the visual object 121 in the third image 120-3 may have a posture 122-3 in which the posture of the camera 110 is applied when acquiring the third image 120-3 to the posture 116-3 of the body 115. For example, the posture of the camera 110 when acquiring the third image 120-3 may be a posture caused by the movement of the camera 110. However, it is not limited thereto.

In various embodiments, the video sequence 119 obtained through the camera 110 may be provided to the electronic device 130. For example, when the camera 110 and the electronic device 130 are implemented as a single apparatus, the electronic device 130 may directly receive the video sequence 119 from the camera 110 or may receive the video sequence 119 from the camera 110 through another circuit distinct from the camera 110 and the electronic device 130. For another example, when the camera 110 and the electronic device 130 are implemented with different devices, the electronic device 130 may directly receive the video sequence 119 from the device comprising the camera 110 or may receive the video sequence 119 from the device comprising the camera 110 through another device distinct from the device. However, it is not limited thereto.

In various embodiments, the electronic device 130 may obtain a new video sequence 131 based on the video sequence 119 obtained from the camera 110. In various embodiments, the video sequence 131 may comprise a plurality of images. For example, the plurality of images may comprise a first image 132-1, a second image 132-2 directly next to the first image 131-1, and a third image 132-3 directly next to the second image 132-2. For example, each of the plurality of images may comprise a visual object 133 corresponding to the visual object 121. FIG. 1 illustrates an example in which the shape of the visual object 133 is distinct from the shape of the visual object 121, but this is for convenience of description. According to embodiments, the shape of the visual object 133 may be the same as the shape of the visual object 121.

For example, the visual object 133 in each of the plurality of images may have each of a plurality of postures corresponding to each of the plurality of postures of the body 115. For example, the visual object 133 in each of the plurality of images may have a posture independent of the movement of the camera 110, unlike the visual object 121 having a posture dependent on the movement of the camera 110. For example, when the camera 110 is moved while acquiring the video sequence 119, the posture of the visual object 133 in the first image 131-1 may be distinct from the posture 122-1 of the visual object 121 in the first image 120-1 and may correspond to the posture 116-1 of the body 115. For another example, when the camera 110 is moved while acquiring the video sequence 119, the posture of the visual object 133 in the second image 131-2 is distinct from the posture 122-2 of the visual object 121 in the second image 120-2, and may correspond to the posture 116-2 of the body 115. For another example, when the camera 110 is moved while acquiring the video sequence 119, the posture of the visual object 133 in the third image 131-3 may be distinct from the posture 122-3 of the visual object 121 in the third image 120-3 and may correspond to the posture 116-3 of the body 115. In other words, the electronic device 130 may reflect only the movement of the body 115 among the movement of the camera 110 and the movement of the body 115, and obtain a video sequence 131 comprising a plurality of images including a visual object 133 corresponding to the body 115, based on the video sequence 119.

Figure 2:
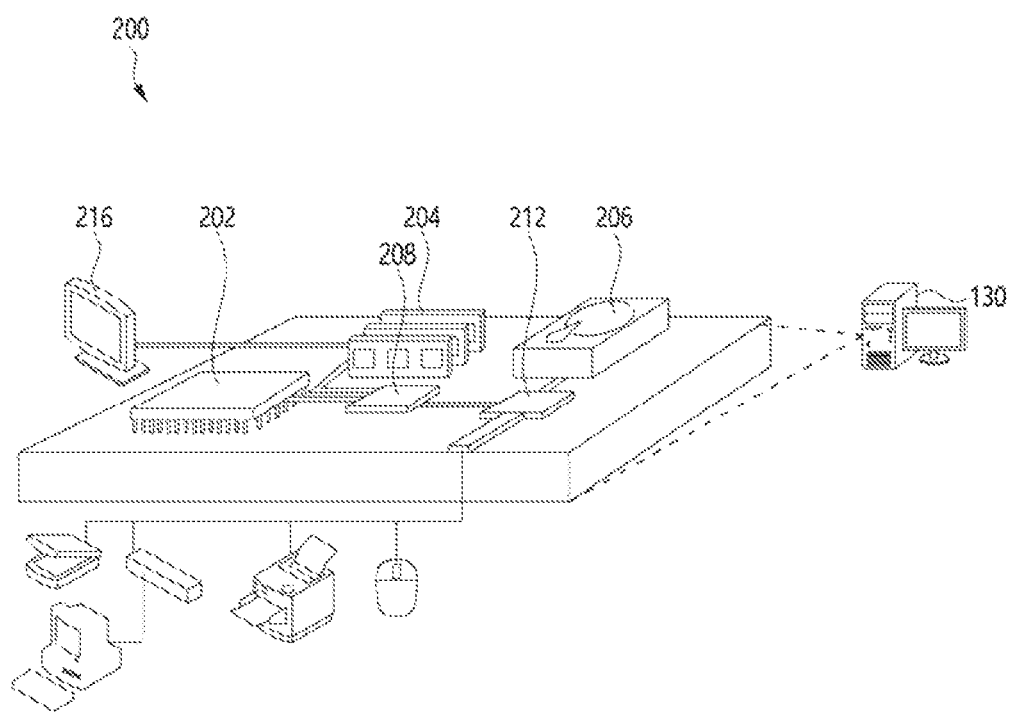
FIG. 2 is a simplified block diagram illustrating a functional configuration of an electronic device according to various embodiments.
Figure 2:
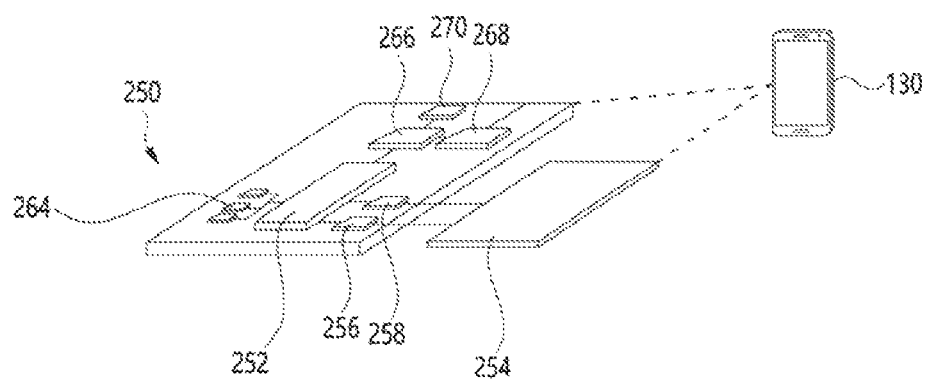

FIG. 2 is a simplified block diagram illustrating a functional configuration of an electronic device according to various embodiments.

Referring to FIG. 2, the electronic device 200 may be an example of the electronic device 130. The electronic device 200 may comprise a processor 202, a memory 204, a storage device 206, a high-speed controller 208 (e.g., a northbridge), a main controller hub (MCH), and a low-speed controller 212 (e.g., a southbridge), and an ICH (input/output (I/O) controller hub). In the electronic device 200, each of the processor 202, the memory 204, the storage device 206, the high-speed controller 208, and the low-speed controller 212 may be interconnected using various buses.

For example, the processor 202 may process instructions for execution in the electronic device 200 to display graphic information about a graphical user interface (GUI) on an external input/output device such as a display 216 connected to the high-speed controller 208. The instructions may be comprised in the memory 204 or the storage device 206. The instructions, when executed by the processor 202, may cause the electronic device 200 to perform one or more operations described above and/or one or more operations described below. According to embodiments, the processor 202 may be composed of a plurality of processors comprising a communication processor and a graphical processing unit (GPU).

For example, the memory 204 may store information in the electronic device 200. For example, the memory 204 may be a volatile memory unit or units. As another example, the memory 204 may be a nonvolatile memory unit or units. As another example, the memory 204 may be another type of computer-readable medium, such as a magnetic or optical disk.

For example, the storage device 206 may provide a mass storage space to the electronic device 200. For example, storage device 206 may be a computer-readable medium such as a hard disk device, an optical disk device, a flash memory, a solid-state memory device, or an array of devices in a storage area network (SAN).

For example, the high-speed controller 208 may manage bandwidth-intensive operations for the electronic device 200, while the low-speed controller 212 may manage low-bandwidth-intensive operations for the electronic device 200. For example, while the high-speed controller 208 is coupled to the memory 204 and coupled to the display 216 through a GPU or accelerator, the low-speed controller 212 may be coupled to the storage device 206 and coupled to various communication ports (e.g., a USB (universal serial bus), a Bluetooth, a Ethernet, a wireless Ethernet) for communication with an external electronic device (e.g., a keyboard, a transducer, a scanner, or a network device (e.g., a switch or a router).

The electronic device 250 may be an example of the electronic device 130. The electronic device 250 may comprise an input/output device such as a processor 252, a memory 264, a display 254 (e.g., an organic light emitting diode (OLED) display or other suitable display), a communication interface 266, and a transceiver 268. Each of the processor 252, the memory 264, the input/output device, the communication interface 266, and the transceiver 268 may be interconnected using various buses.

For example, the processor 252 may process instructions comprised in the memory 264 to display graphic information on the GUI on the input/output device. The instructions, when executed by the processor 252, may cause the electronic device 250 to perform one or more operations described above and/or one or more operations described below. For example, the processor 252 may interact with the user through the display interface 256 coupled to the display 254 and the control interface 258. For example, the display interface 256 may comprise a circuit for driving the display 254 to provide visual information to the user, and the control interface 258 may comprise a circuit for converting the commands to receive commands received from a user and provide the commands to the processor 252. According to embodiments, the processor 252 may be implemented as a chipset of chips comprising analog and digital processors.

For example, the memory 264 may store information in the electronic device 250. For example, the memory 264 may comprise at least one of one or more volatile memory units, one or more nonvolatile memory units, or computer-readable media.

For example, the communication interface 266, based on interworking with the processor 252, may perform wireless communication between the electronic device 250 and the external electronic device through various communication techniques such as cellular communication techniques, Wi-Fi communication techniques, NFC techniques, or Bluetooth communication techniques. For example, the communication interface 266 may be coupled to the transceiver 268 to perform the wireless communication. For example, the communication interface 266 may be further coupled to a global navigation satellite system (GNSS) reception module 270 to obtain location information of the electronic device 250.

As described above, the electronic device (e.g., electronic device 130) according to various embodiments may comprise a memory (e.g., memory 204 and/or storage device 206) configured to store instructions and at least one processor (e.g., processor 202 or processor 252) configured, when executing the instructions, to obtain a first video sequence including a visual object corresponding to a body; obtain a local posture sequence of the visual object that indicates postures of at least one visual element of the visual object in the first video sequence, the at least one visual element of the visual object corresponding to at least one joint of the body; obtain a global motion sequence of the visual object, based on a difference between the postures of the at least one visual element, the postures of the at least one visual object obtained by using the local posture sequence; and obtain a second video sequence, based on the local posture sequence and the global motion sequence.

In various embodiments, the local posture sequence indicating the postures of the at least one visual element may be configured with data for orientations of the at least one visual object in the first video sequence.

In various embodiments, the global motion sequence may be configured with data for a difference between positions of a part of the visual object in the first video sequence and data for a difference between orientations of the part of the visual object in the first video sequence, and wherein the part of the visual object corresponds to a root of the body.

In various embodiments, the at least one processor, when executing the instructions, may be configured to obtain the global motion sequence by inputting the local posture sequence to a model including gated recurrent units (GRUs).

In various embodiments, the at least one processor, when executing the instructions, may be configured to obtain a global posture sequence converted from the global motion sequence; and obtain the second video sequence, based on the local posture sequence and the global posture sequence.

In various embodiments, the first video sequence may include a plurality of images obtained, while a camera is moved, through the camera, and at least one processor, when executing the instructions, may be configured to identify at least one image obtained through the camera while the camera being moved has a predetermined posture, from among the plurality of images included in the first video sequence; and obtain the local posture sequence by analyzing the plurality of images with respect to the identified at least one image.

In various embodiments, the first video sequence may be a video sequence obtained, while a camera is moved, through the camera, and wherein the second video sequence may include a new visual object corresponding to the body having postures independently from the movement of the camera.

In various embodiments, the at least one processor, when executing the instructions, may be configured to obtain the global motion sequence by at least partially applying a skinned multi-person linear (SMPL) model to the local posture sequence.

As described above, the electronic device according to various embodiments may comprise a memory configured to store instructions and, when executing the instructions, at least one processor configured to obtain, while a camera is moved, a first video sequence including a first image and a second image subsequent to the first image, the first image and the second image obtained through the camera; identify a visual object in the first image corresponding to a body and the visual object in the second image; determine postures of the body independently from the movement of the camera, based on a difference between a posture of at least one visual element of the visual object in the first image corresponding to at least one joint of the body and a posture of at least one visual element of the visual object in the second image corresponding to the at least one joint; and obtain a second video sequence including a new visual object having the determined postures.

In various embodiments, the at least one processor, when executing the instructions, may be configured to identify the difference between the posture of the at least one visual element of the visual object in the first image and the posture of the at least one visual element of the visual object in the second image, based on a difference between an orientation of the at least one visual element of the visual object in the first image and an orientation of the at least one visual element of the visual object in the second image.

In various embodiments, the at least one processor, when executing the instructions, may be configured to identify, from among a plurality of images included in the first video sequence, the first image obtained through the camera while the camera being moved has a predetermined posture; and determine the postures of the body, based on the difference between the posture of the at least one visual element of the visual object in the identified first image and the posture of the at least one visual element of the visual object in the identified second image.

In various embodiments, a movement of the visual object in the first video sequence may reflect the movement of the camera and a movement of the body, and wherein a movement of the new visual object in second video sequence only reflects the movement of the body among the movement of the camera and the movement of the body.

In various embodiments, each of a plurality of images in the first video sequence including the first image and the second image may only include a part occupied by the visual object and a background part only having a first color.

In various embodiments, the second video sequence may correspond to a video sequence photographing the body by using a camera of a fixed state.

Figure 3:
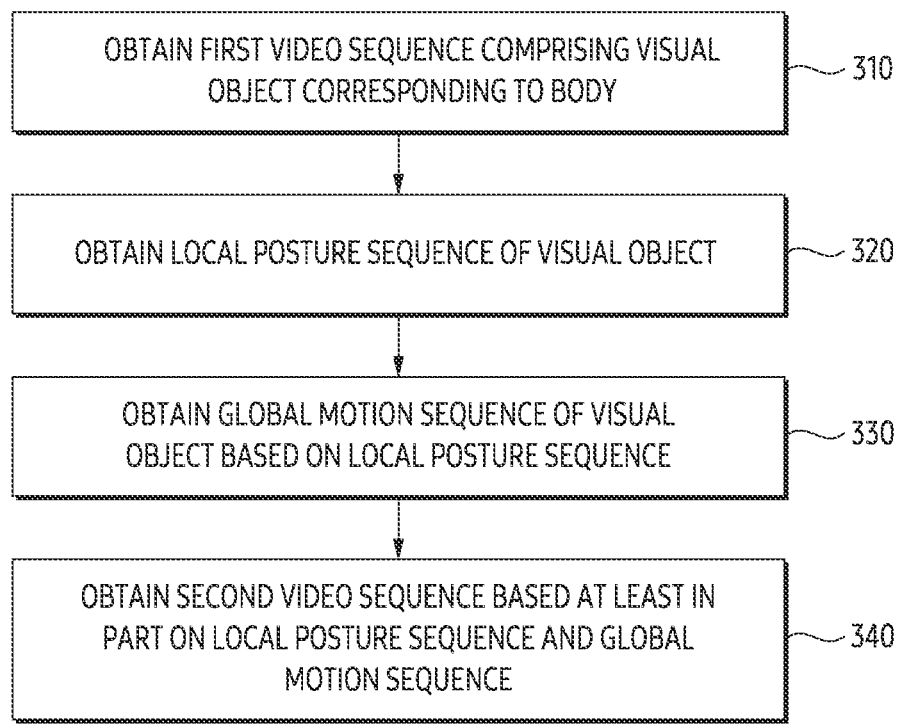
FIG. 3 is a flowchart illustrating a method of obtaining a video sequence based on a local posture sequence according to various embodiments.

FIG. 3 is a flowchart illustrating a method of obtaining a video sequence based on a local posture sequence according to various embodiments. This method may be executed by the electronic device 130 illustrated in FIG. 1, the electronic device 200 (or the electronic device 250) illustrated in FIG. 2, or the processor 202 of the electronic device 200 (or the processor 252 of the electronic device 25).

Figure 4:
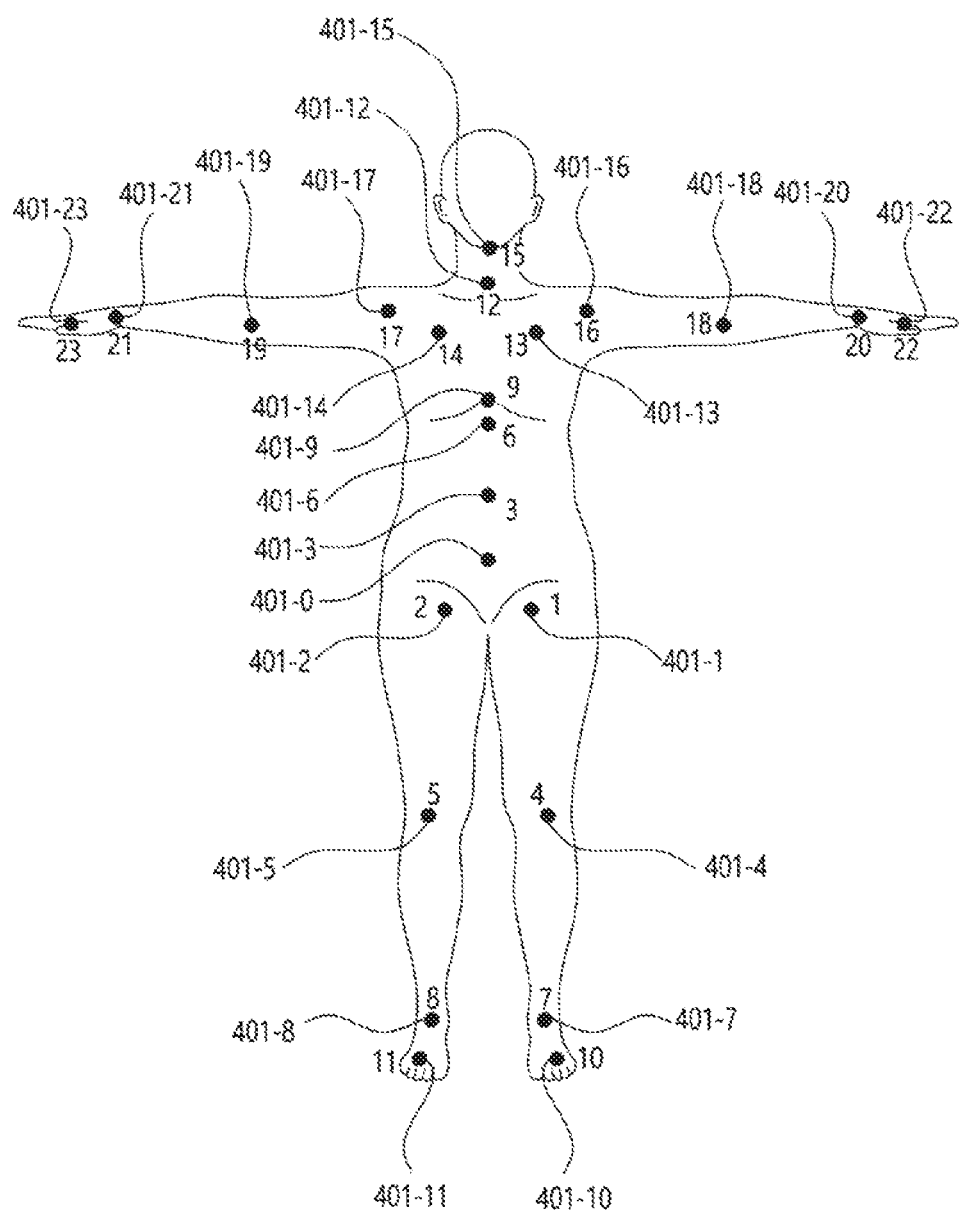
FIG. 4 illustrates an example of a body comprising at least one joint.

FIG. 4 illustrates an example of a body including at least one joint.

Figure 5:
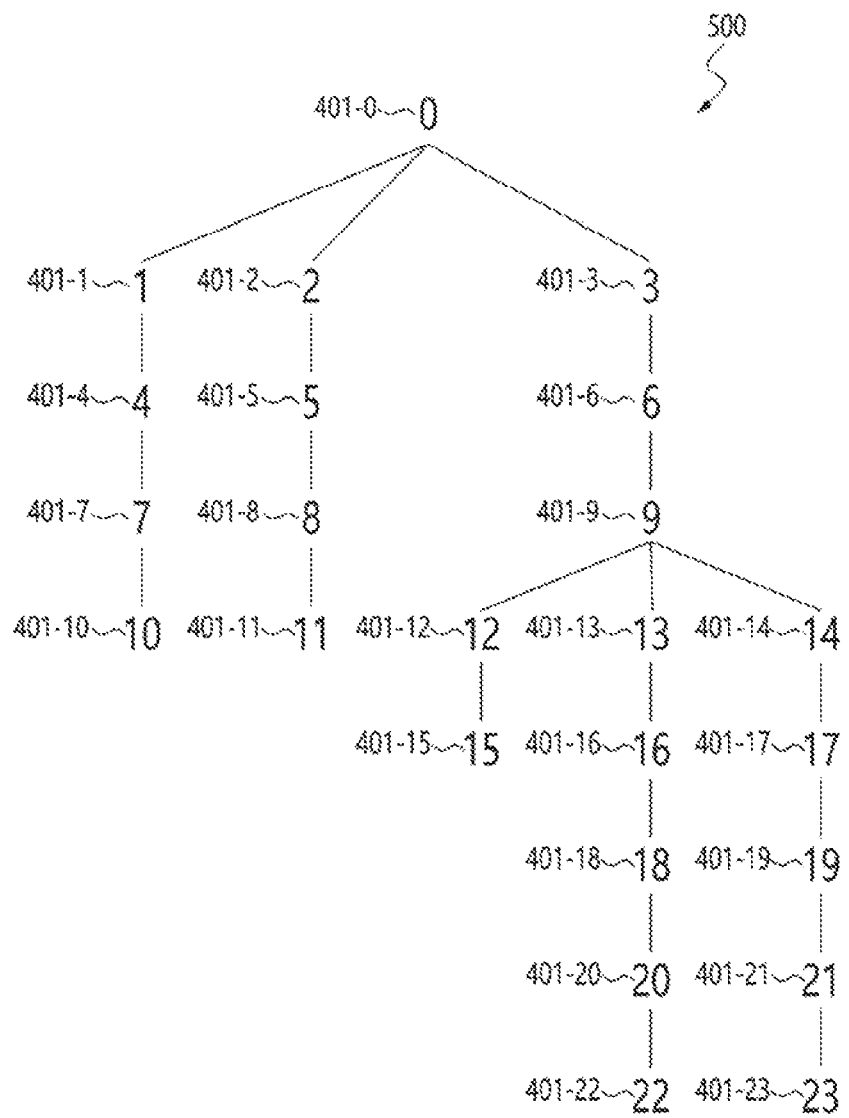
FIG. 5 illustrates an example of a relationship between a root in the body and at least one joint in the body.

FIG. 5 illustrates an example of a relationship between a root in the body and at least one joint in the body.

Figure 6:
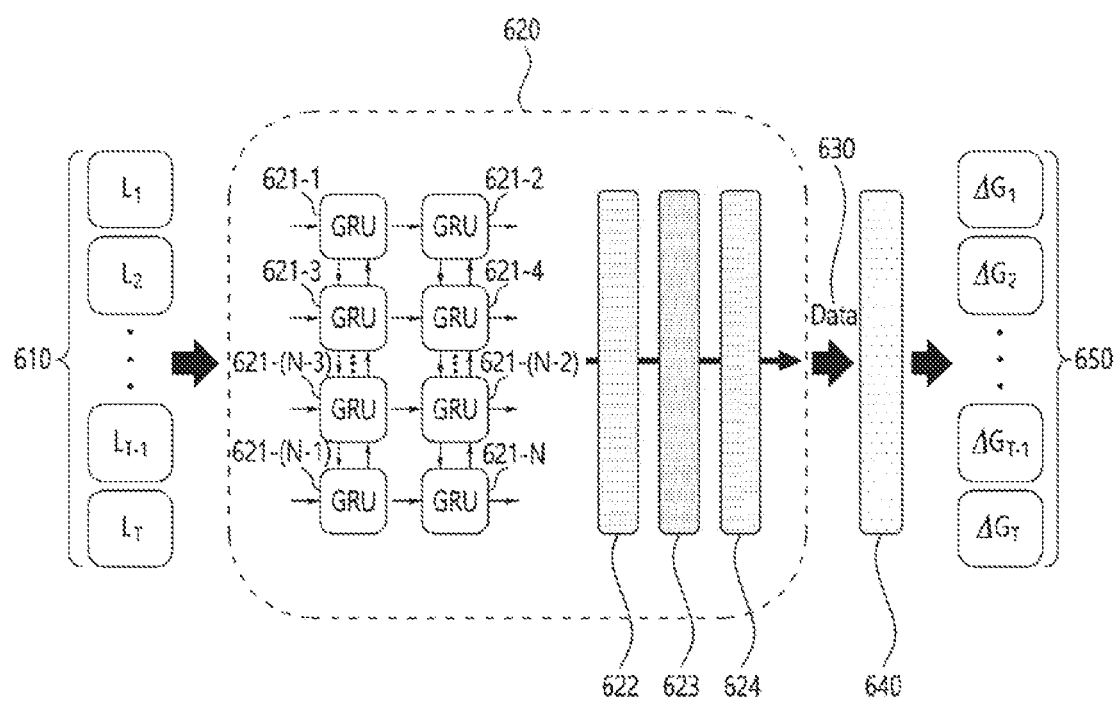
FIG. 6 illustrates a method of obtaining a global motion sequence based on a local posture sequence according to various embodiments.

FIG. 6 illustrates a method of obtaining a global motion sequence based on a local posture sequence according to various embodiments.

Referring to FIG. 3, in operation 310, the processor 202 may obtain a first video sequence comprising a visual object corresponding to the body. For example, the first video sequence may be a video sequence obtained through the camera 110 illustrated in FIG. 1. For example, the first video sequence may be obtained by photographing the body (e.g., the body 115) using the moving camera 110. For example, the first video sequence may be a video sequence 119 defined through the description of FIG. 1, and the visual object may be a visual object 121 defined through the description of FIG. 1. For example, the movement of the visual object in the first video sequence may reflect the movement of the camera 110 during the acquisition of the first video sequence and the movement of the body during the acquisition of the first video sequence. For example, the movement of the visual object in the first video sequence may reflect the movement of the camera 110 during the acquisition of the first video sequence and the movement of the body during the acquisition of the first video sequence. For example, the movement of the visual object in the first video sequence may be a movement defined in a camera coordinate system. For example, a plurality of postures constituting the movement of the visual object in the first video sequence may reflect a plurality of postures constituting the movement of the camera 110 during the acquisition of the first video sequence and a plurality of postures constituting the movement of the body during the acquisition of the first video sequence. For example, a plurality of postures constituting the movement of the visual object in the first video sequence may be a plurality of postures defined within the camera coordinate system.

In various embodiments, the processor 202 may obtain the first video sequence by receiving the first video sequence from an electronic device that is distinct from the electronic device 130 and includes the camera 110. In various embodiments, processor 202 may obtain the first video sequence through camera 110 comprised in electronic device 130. However, it is not limited thereto.

In operation 320, processor 202 may obtain a local posture sequence of the visual object. For example, the local posture sequence may indicate postures of at least one visual element of the visual object corresponding to at least one joint in the body. For example, each of the postures of the at least one visual element may correspond to each of the postures of the at least one joint.

For example, referring to FIG. 4, the body 400 corresponding to the body may comprise a root 401-0 for representing a global state of the body 400. The body 400 may comprise the at least one joint including joints 401-1 to 401-23 based on the root 401-0. For example, the at least one visual element may correspond to the at least one joint including joints 401-1 to 401-23. For example, the relationship between the root 401-0 and each of the joints 401-1 to 401-23 may be expressed in a hierarchical manner within a generic coordinate system. For example, referring to FIG. 5, a kinematic tree 500 may comprise a root 401-0 in the body 400 and a joint 401-1 in the body 400 to a joint 401-23 in the body 400. In the kinematic tree 500, the root 401-0 may be a top node. The root 401-0 which is the top node may be directly associated with joints 401-1 to 401-3 which are child nodes of the root 401-0. In other words, the root 401-0 may be a parent node of each of the joint 401-1 to the joint 401-3. The joint 401-1 may be directly related to the joint 401-4 which is a child node of the joint 401-1. In other words, the joint 401-1 may be a parent node of the joint 401-2. The joint 401-4 may be directly related to the joint 401-7, which is a child node of the joint 401-4. In other words, the joint 401-4 may be a parent node of the joint 401-7. The joint 401-7 may be directly related to the joint 401-10, which is a child node of the joint 401-7. In other words, the joint 401-7 may be a parent node of the joint 401-10. The joint 401-2 may be directly related to the joint 401-5, which is a child node of the joint 401-2. In other words, the joint 401-2 may be a parent node of the joint 401-5. The joint 401-5 may be directly related to the joint 401-8, which is a child node of the joint 401-5. In other words, the joint 401-5 may be a parent node of the joint 401-8. The joint 401-8 may be directly related to the joint 401-11 which is a child node of the joint 401-8. In other words, the joint 401-8 may be a parent node of the joint 401-11. The joint 401-3 may be directly related to the joint 401-6, which is a child node of the joint 401-3. In other words, the joint 401-3 may be a parent node of the joint 401-6. The joint 401-6 may be directly related to the joint 401-9, which is a child node of the joint 401-6. In other words, the joint 401-6 may be a parent node of the joint 401-9. The joint 401-9 may be directly related to the joint 401-12, the joint 401-13, and the joint 401-14 which are child nodes of the joint 401-9. In other words, the joint 401-9 may be a parent node of the joint 401-12, the joint 401-13, and the joint 401-14. The joint 401-12 may be directly related to the joint 401-15, which is a child node of the joint 401-12. In other words, the joint 401-12 may be a parent node of the joint 401-15. The joint 401-13 may be directly related to the joint 401-16, which is a child node of the joint 401-13. The joint 401-16 may be directly related to the joint 401-18, which is a child node of the joint 401-16. In other words, the joint 401-16 may be a parent node of the joint 401-18. The joint 401-18 may be directly related to the joint 401-20, which is a child node of the joint 401-18. In other words, the joint 401-18 may be a parent node of the joint 401-20. The joint 401-20 may be directly related to the joint 401-22, which is a child node of the joint 401-20. In other words, the joint 401-20 may be a parent node of the joint 401-22. The joint 401-14 may be directly related to the joint 401-17, which is a child node of the joint 401-14. In other words, the joint 401-14 may be a parent node of the joint 401-17. The joint 401-17 may be directly related to the joint 401-19, which is a child node of the joint 401-17. In other words, the joint 401-17 may be a parent node of the joint 401-19. The joint 401-19 may be directly related to the joint 401-21, which is a child node of the joint 401-19. In other words, the joint 401-19 may be a parent node of the joint 401-21. The joint 401-21 may be directly related to the joint 401-23, which is a child node of the joint 401-21. In other words, the joint 401-21 may be a parent node of the joint 401-23. In various embodiments, like the representation of the kinematic tree 500, the root 401-0 may be directly or indirectly related to each of the joint 401-1 to the joint 401-23. In various embodiments, since the root 401-0 is directly or indirectly related to each of the joints 401-1 to 401-23, the postures of the joint 401-1 to the postures of the joint 401-23 may be used to indicate the global postures of the body 400 expressed based on the root 401-0. For example, a change between the postures of the joint 401-1 or a change between the postures of the joint 401-23 may be used to indicate the global motion of the body 400.

FIGS. 4 and 5 illustrate an example in which the body comprises 23 joints, but this is for convenience of description. For example, when the body is another animal distinct from a human, the number of joints comprised in the body may be changed. For another example, when a criterion for classifying joints is changed, even if the body is a human body, the number of joints in the body may be changed.

Meanwhile, in various embodiments, the local posture sequence may indicate postures of the at least one visual element of the visual object corresponding to the at least one joint in the body. In various embodiments, the local posture sequence may be configured with data about orientations within the first video sequence of the at least one visual element. For example, the local posture sequence may be expressed as Equation 1 below.

$$L=\{L_i\}_{i=1}^{T} \qquad \text{[Equation 1]}$$

In Equation 1, L may represent a local posture sequence, T may represent the length of the first video sequence, and $L_i$ may represent the posture of the at least one visual element in the ith image among a plurality of images in the first video sequence of length T. $L_i$ in Equation 1 may be expressed as Equation 2 below to represent 23 relative orientations of the at least one visual element as a unit-quaternion. According to embodiments, $L_i$ may be expressed as an Euler angle.

$$L_i \in \mathbb{R}^{92} \qquad \text{[Equation 2]}$$

According to embodiments, when $L_i$ is expressed as an Euler angle, $L_i$ may be expressed in 69 dimensions (23×3 dimensions).

For example, the processor 202 may obtain the local posture sequence by at least partially applying the first video sequence to a skinned multi-person linear model (SMPL). When an SMPL model is used, the local posture sequence may be expressed as values (e.g., pitch-roll-yaw) for indicating the amount of rotation of the at least one visual element of the visual object. According to embodiments, when another model distinct from the SMPL model is used, the local posture sequence may be expressed through a value (e.g., a coordinate value) for indicating the location of the at least one visual element of the visual object.

In operation 330, processor 202 may obtain a global motion sequence of the visual object based on the local posture sequence. For example, the processor 202 may obtain a global motion sequence of the visual object based on a difference between the postures of the at least one visual element. For example, the global motion sequence may be configured with data on a difference between locations in the first video sequence of the part of the visual object corresponding to the root of the body and data on a difference between orientations in the first video sequence of the part of the visual object.

For example, referring to FIG. 6, the processor 202 may input the local posture sequence 610 obtained in operation 320 into a temporal encoder 620. The processor 202 may obtain data 630 for representing a latent feature by processing the local posture sequence 610 using a GRU (gated recurrent unit) (621-1) to GRU (621-N) in the time encoder 620, a rectifier (or ReLU (rectified linear unit)) activation function (622) in the time encoder 620, a linear projection layer 623 in the time encoder 620 and/or a rectifier 624 in the time encoder 620. According to embodiments, each of GRU 621-1 to GRU 621-N may be implemented as a bidirectional GRU. However, it is not limited thereto.

In various embodiments, the processor 202 may input data 630 into a motion regression layer 640. The processor 202 may obtain a global motion sequence 650 corresponding to the global motion sequence by processing the data 630 using the motion regression layer 640. For example, the global motion sequence 650 may be expressed as Equation 3 below.

$$\Delta G = \{\Delta G_i\}_{i=1}^{T} \qquad \text{[Equation 3]}$$

In Equation 3, T may represent the length of the first video sequence, $\Delta G_i$ may represent the global motion of the visual object in the i-th image among a plurality of images in the first video sequence of length T, and $\Delta G$ may represent a global motion sequence 650.

For example, the global motion sequence 650 may be composed of a three-dimensional orientation motion and a three-dimensional translation motion.

In operation 340, processor 202 may obtain a second video sequence based at least in part on the local posture sequence and the global motion sequence. In various embodiments, the second video sequence may comprise a visual object corresponding to the body. In various embodiments, the shape of the visual object in the second video sequence may be the same as or different from the shape of the visual object in the first video sequence. In various embodiments, the movement of the visual object in the second video sequence may reflect only the movement of the body among the movement of the body during the acquisition of the first video sequence and the movement of the camera 110 during the acquisition of the first video sequence. For example, the movement of the visual object in the second video sequence may be a movement defined within a world coordinate system. For example, the movement of the visual object in the second video sequence may be independent of the movement of the camera 110 while obtaining the first video sequence, unlike the movement of the visual object in the first video sequence.

In various embodiments, processor 202 may obtain a global posture sequence based on the global motion sequence. For example, the processor 202 may obtain the global posture sequence by accumulating the global motion sequence. For example, the global motion sequence may be accumulated using Equations 4 to 6 below.

$$G_{i+1} = G_i \Delta G_i = \begin{bmatrix} R_i & T_i \\ 0^T & 1 \end{bmatrix} \begin{bmatrix} \Delta R_i & T_i \\ 0^T & 1 \end{bmatrix} \qquad \text{[Equation 4]}$$

$$R_{i+1} = R_i \Delta R_i, \qquad \text{[Equation 5]}$$

$$T_{i+1} = R_i \Delta T_i + T_i \qquad \text{[Equation 6]}$$

In Equations 4 to 6, $G_i$ may represent the global posture of the visual object in the i-th image among a plurality of images in the first video sequence of length T, $R_i$ may represent a rotation matrix (e.g., 3×3) for the i-th image, $T_i$ may represent the location of the visual object in the i-th image, and $\Delta T_i$ may represent a change in the location of the visual object between the i-th image and the i+1-th image.

For example, the global posture sequence may be expressed as Equation 7 below.

$$G = \{G_i\}_{i=1}^{T} \qquad \text{[Equation 7]}$$

In Equation 7, 1 may represent the length of the first video sequence, $G_i$ may represent the global posture of the visual object in the 4-th image among a plurality of images in the first video sequence of length T, and G may represent the global posture sequence.

In various embodiments, processor 202 may obtain the second video sequence based on the local posture sequence and the global posture sequence. For example, the processor 202 may obtain a global human mesh sequence in the world coordinate system as the second video sequence by converting the local posture sequence and the global posture sequence. For example, the global human mesh sequence may be obtained by converting the local posture sequence and the global posture sequence through a skinned multi-person linear model (SMPL model). For example, the global human mesh sequence may be composed of a parameter for indicating a posture and a parameter for indicating a shape.

As described above, the electronic device 130 according to various embodiments may obtain the local posture sequence from the first video sequence and obtain the second video sequence based on at least a part of the local posture sequence. Since the second video sequence, unlike the first video sequence, is a video sequence reflecting only the movement of the body, the electronic device 130 may obtain a video sequence objectively reflecting the movement of the body from a video sequence reflecting the movement of the camera.

Figure 7:
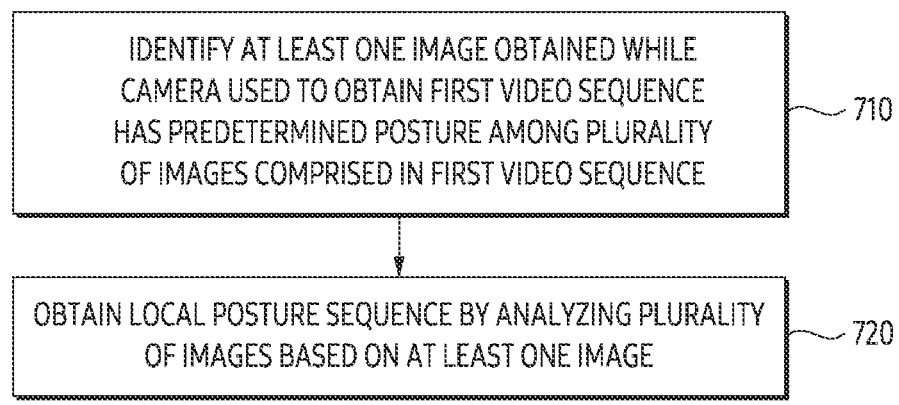
FIG. 7 is a flowchart illustrating a method of obtaining a local posture sequence for the first video sequence based on at least one image among a plurality of images in the first video sequence according to various embodiments.

FIG. 7 is a flowchart illustrating a method of obtaining a local posture sequence for the first video sequence based on at least one image among a plurality of images in the first video sequence according to various embodiments. This method may be executed by the electronic device 130 illustrated in FIG. 1, the electronic device 200 (or the electronic device 250) illustrated in FIG. 2, or the processor 202 of the electronic device 200 (or the processor 252 of the electronic device 25).

Operation 710 to operation 720 of FIG. 7 may be related to operation 320 of FIG. 3.

Referring to FIG. 7, in operation 710, the processor 202 may identify at least one image obtained while the camera 110 used to obtain the first video sequence has a predetermined posture among a plurality of images comprised in the first video sequence. For example, the plurality of images included in the first video sequence may comprise an image comprising the at least one visual element of the visual object, reflecting well the features of the at least one joint posture in the body. For example, the at least one image identified among the plurality of images included in the first video sequence may be an image obtained while the camera 110 faces the front of at least a part of the at least one joint in the body. For example, the at least one image among the plurality of images may represent the posture of the at least one joint better than the remaining images among the plurality of images. For example, the processor 202 may identify the at least one image obtained through the camera 110 having the predetermined posture facing the front of the at least one joint by analyzing each of the plurality of images.

In operation 720, processor 202 may obtain the local posture sequence by analyzing the plurality of images (or the remaining images) based on the at least one identified image.

For example, the processor 202 may estimate the posture of the at least one visual element of the visual object in each of the remaining images based on the posture of the at least one visual element of the visual object in the at least one image. For example, when the plurality of images in the first video sequence are first image to Nth image, and the at least one image is a Kth image (Here, K is any natural number of 1 or more and N or less.) among the first image to the Nth image, processor 202 may determine a posture of at least one visual element of the visual object in the Kth image, and may determine the posture of at least one visual element of the visual object in each of the remaining images excluding the Kth image among the first image to the Nth image based on the determined posture.

According to embodiments, processor 202 may perform image processing of each of the remaining images based on the posture of at least one visual element of the visual object in the K-th image before determining the posture of the at least one visual element of the visual object in each of the remaining images. For example, the image processing may comprise changing the orientation of the at least one visual element of the visual object in each of the remaining images to assist in determining the posture of the at least one visual element of the visual object in each of the remaining images. Processor 202 may determine the posture of at least one visual element of the visual object by comparing each of the remaining images on which the image processing has been performed with the K-th image. Processor 202 may obtain the local posture sequence based on the posture of the at least one visual element of the visual object in the K-th image and the posture of the at least one visual element of the visual object in each of the remaining images. However, it is not limited thereto.

As described above, the electronic device 130 according to various embodiments may identify the at least one image among the plurality of images comprised in the first video sequence before obtaining the local posture sequence so that the local posture sequence well reflects the posture of at least one joint in the body. In other words, the electronic device 130 according to various embodiments may execute pre-processing on the first video sequence to obtain a video sequence independent of the movement of the camera 110.

Figure 8:
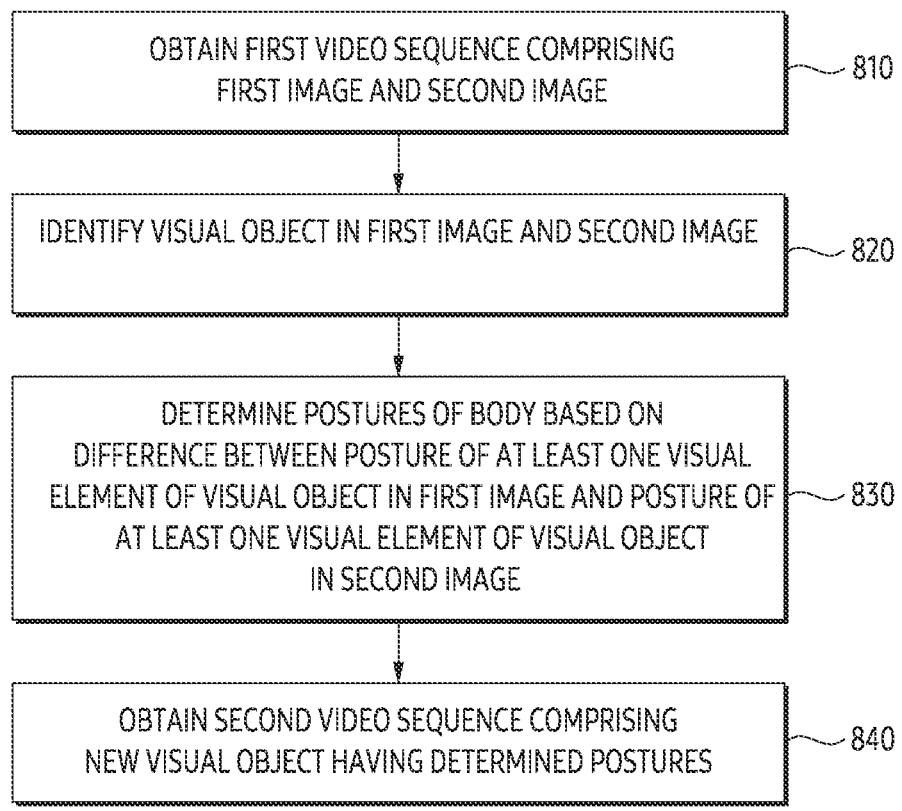
FIG. 8 is a flowchart illustrating a method of determining body postures independent of the movement of the camera using a video sequence obtained through the camera according to various embodiments.

FIG. 8 is a flowchart illustrating a method of determining body postures independent of the movement of the camera using a video sequence obtained through the camera according to various embodiments. This method may be executed by the electronic device 130 illustrated in FIG. 1, the electronic device 200 (or the electronic device 250) illustrated in FIG. 2, or the processor 202 of the electronic device 200 (or the processor 252 of the electronic device 25).

Referring to FIG. 8, in operation 810, the processor 202 may obtain a first video sequence comprising a first image obtained through the camera 110 and a second image after the first image while the camera 110 is moving. For example, the first image may mean an image in the Kth frame among a plurality of images constituting the first video sequence, and the second image may mean an image in the K+1th frame among the plurality of images. In other words, the first image and the second image may be two consecutive images among the plurality of images constituting the first video sequence.

In operation 820, the processor 202 may identify a visual object in the first image corresponding to a body, which is a subject of the camera 110 used to obtain the first video sequence, and a visual object in the second image corresponding to the body. For example, the processor 202 may extract feature points from each of the first image and the second image, may identify the visual object in the first image corresponding to the body from the first image based on the extracted feature points, and may identify the visual object in the second image corresponding to the body from the second image.

In operation 830, processor 202 may determine postures of the body independent of the movement of the camera based on a difference between the posture of at least one visual element of the visual object in the first image corresponding to at least one joint of the body and the posture of at least one visual element of the visual object in the second image corresponding to the at least one joint corresponding to at least one joint of the body. For example, processor 202 may determine a part of the visual object corresponding to the at least one joint as the at least one visual element of the visual object in the first image based on analysis of the first image and may identify the posture of the determined at least one visual element by executing image processing on the determined at least one visual element. Processor 202 may determine a part of the visual object corresponding to the at least one joint as the at least one visual element of the visual object in the second image based on analysis of the second image and may identify the posture of the determined at least one visual element by executing image processing on the determined at least one visual element. Processor 202 may estimate the movement of the at least one joint of the body based on the changed posture of the at least one visual element in the second image from the posture of the at least one visual element in the first image and may determine postures of the body when obtaining the first image and the second image based on the estimated movement.

For example, the difference between the posture of the at least one visual element of the visual object in the first image and the posture of the at least one visual element of the visual object in the second image, based on a difference between an orientation of the at least one visual element of the visual object in the first image and an orientation of the at least one visual element of the visual object in the second image, may be identified.

In operation 840, processor 202 may obtain a second video sequence comprising a new visual object having the determined postures. In various embodiments, the posture of the new visual object in the second video sequence may correspond only to the posture of the body, unlike the first image in the first video sequence and the visual object in the second image. For example, the first video sequence may comprise the visual object reflecting both the movement of the camera 110 and the posture of the body, while the second video sequence may comprise the new visual object independent of the movement of the camera 110 and reflecting only the posture of the body.

In various embodiments, the shape of the new visual object in the second video sequence may be distinct from the shape of the visual object in the first video sequence. For example, the visual object in the first video sequence may have a shape corresponding to the representation of the body and has a posture distinct from the posture of the body, whereas the new visual object in the second video sequence may have a shape distinct from the representation of the body and a posture corresponding to the posture of the body.

As described above, the electronic device 130 according to various embodiments may obtain the second video sequence reflecting only the movement (or postures) of the body by compensating for the movement of the camera 110 during obtaining the first video sequence by executing operation 810 to operation 840. In various embodiments, electronic device 130 may be distinct from other electronic devices that obtain the second video sequence reflecting only the movement of the body by receiving information on the movement of the camera 110 while obtaining the first video sequence and by processing the first video sequence based on the information. In various embodiments, electronic device 130 may be distinct from other electronic devices that acquire the second video sequence reflecting only the movement of the body by compensating for the movement of the camera 110 during the acquisition of the first video sequence based on the movement of another visual object in the first video sequence corresponding to the subject fixed around the body. For example, when obtaining the first video sequence through the camera 110 in a state where there are no subjects around the body, unlike other electronic devices, electronic device 130 may obtain the second video sequence reflecting only the movement of the body, based on the postures of at least one visual element of the visual object in the first video sequence corresponding to at least one joint of the body.

Methods according to the embodiments described in the claims or specification of the present disclosure may be implemented in the form of hardware, software, or a combination of hardware and software.

When implemented in software, a computer-readable storage medium for storing one or more programs (software modules) may be provided. One or more programs stored in a computer-readable storage medium are configured for execution by one or more processors in the device. One or more programs comprise instructions for an electronic device to execute methods according to embodiments described in the claim or the specification of the present disclosure.

These one or more programs (software modules, software) may be stored in a random-access memory, a non-volatile memory containing flash memory, a ROM (Read Only Memory), an Electrically Erasable Programmable Read Only Memory (EEPROM), a magnetic disc storage device, an optical storage device (e.g., Compact Disc-ROM (CD-ROM), Digital Versatile Discs (DVDs)), a magnetic cassette, or a memory composed of these combinations. Alternatively, it may be stored in a memory composed of some or all of these combinations. In addition, the program may be stored in an attachable storage device that may be accessed through a communication network such as the Internet, an intranet, a local area network (LAN), a wide LAN (WLAN), or a storage area network (SAN), or a communication network consisting of a combination thereof. Such a storage device may access a device performing an embodiment of the present disclosure through an external port. In addition, a separate storage device on the communication network may access a device that performs an embodiment of the present disclosure.

In the above-described specific embodiments of the present disclosure, the components of the electronic device included in the present disclosure are expressed in the singular or plural according to the presented specific embodiments. However, singular or plural expressions of the above components are selected appropriately for the situation presented for convenience of explanation, the present disclosure is not limited to singular or plural components, and even if a component is expressed in plural, it may be composed of a singular, or even if a component is expressed in a singular, it may be composed of a plurality.

Meanwhile, although specific embodiments have been described in the detailed description of the present disclosure, various modifications are possible without departing from the scope of the present disclosure. Therefore, the scope of the present disclosure should not be limited to and determined by the described embodiment and should be determined not only by the scope of claims described below, but also by equivalents to the scope of this claim.

What is claimed is:

1. A non-transitory computer readable storage medium storing one or more programs, the one or more programs comprising instructions to, when executed by an electronic device, cause the electronic device to:
    obtain a first video sequence including a visual object corresponding to a body;
    obtain a local posture sequence of the visual object that indicates postures of at least one visual element of the visual object in the first video sequence, the at least one visual element of the visual object corresponding to at least one joint of the body;
    obtain a global motion sequence of the visual object, based on a difference between the postures of the at least one visual element obtained by using the local posture sequence, wherein the global motion sequence is configured with data on a difference between positions in the first video sequence of a part of the visual object, the part of the visual object corresponds to a top node of nodes which are respectively corresponds to joints of the body including the at least one joint, the nodes are associated with each other in a hierarchical manner; and
    obtain a second video sequence including a new visual object representing movement of the body indicated by the first video sequence, the movement is obtained based on compensation for movement of a camera which was used to take the first video sequence using the global motion sequence.

2. The non-transitory computer readable storage medium of claim 1, wherein the local posture sequence indicating the postures of the at least one visual element is configured with data for orientations of the at least one visual element in the first video sequence.

3. The non-transitory computer readable storage medium of claim 2, wherein the global motion sequence is configured with data for a difference between orientations of the part of the visual object in the first video sequence.

4. The non-transitory computer readable storage medium of claim 1, wherein the non-transitory computer readable storage medium further store instructions to, when executed by at least one processor of the electronic device individually or collectively, cause the electronic device to obtain the global motion sequence by inputting the local posture sequence to a model including gated recurrent units (GRUs).

5. The non-transitory computer readable storage medium of claim 1, wherein the non-transitory computer readable storage medium further store instructions to, when executed by at least one processor of the electronic device individually or collectively, cause the electronic device to:
    obtain a global posture sequence converted from the global motion sequence; and
    obtain the second video sequence, based on the local posture sequence and the global posture sequence.

6. The non-transitory computer readable storage medium of claim 1, wherein the first video sequence includes a plurality of images obtained, while a camera is moved, through the camera, and
    wherein the non-transitory computer readable storage medium further store instructions to, when executed by at least one processor of the electronic device individually or collectively, cause the electronic device to:

identify at least one image obtained through the camera while the camera being moved has a predetermined posture, from among the plurality of images included in the first video sequence; and obtain the local posture sequence by analyzing the plurality of images with respect to the identified at least one image.

7. The non-transitory computer readable storage medium of claim 1, wherein the first video sequence is a video sequence obtained, while a camera is moved, through the camera, and wherein the new visual object included in the second video sequence corresponds to the body having postures independently from the movement of the camera.

8. The non-transitory computer readable storage medium of claim 1, wherein the non-transitory computer readable storage medium further store instructions to, when executed by at least one processor of the electronic device individually or collectively, cause the electronic device to obtain the global motion sequence by at least partially applying a skinned multi-person linear (SMPL) model to the local posture sequence.

9. A non-transitory computer readable storage medium storing one or more programs, the one or more programs comprising instructions to, when executed by an electronic device, cause the electronic device to:

obtain, using a camera being moved according to a first state, a first video sequence including a first image and a second image subsequent to the first image, the first image and the second image obtained through the camera;

identify a visual object in the first image corresponding to a body and the visual object in the second image, the visual object in the first video sequence having a shape corresponding to a representation of the body;

determine postures of the body independently from the movement of the camera, based on a difference between a posture of at least one visual element of the visual object in the first image corresponding to at least one joint of the body and a posture of at least one visual element of the visual object in the second image corresponding to the at least one joint; and obtain a second video sequence indicating an appearance of a new visual object, which is viewed from another camera that is fixed according to a second state, having the determined postures; and wherein the new visual object in the second video sequence has a shape distinct from the representation of the body.

10. The non-transitory computer readable storage medium of claim 9, wherein the non-transitory computer readable storage medium further store instructions to, when executed by at least one processor of the electronic device individually or collectively, cause the electronic device to identify the difference between the posture of the at least one visual element of the visual object in the first image and the posture of the at least one visual element of the visual object in the second image, based on a difference between an orientation of the at least one visual element of the visual object in the first image and an orientation of the at least one visual element of the visual object in the second image.

11. The non-transitory computer readable storage medium of claim 9, wherein the non-transitory computer readable storage medium further store instructions to, when executed by at least one processor of the electronic device individually or collectively, cause the electronic device to:

identify, from among a plurality of images included in the first video sequence, the first image obtained through the camera while the camera being moved has a predetermined posture; and determine the postures of the body, based on the difference between the posture of the at least one visual element of the visual object in the identified first image and the posture of the at least one visual element of the visual object in the identified second image.

12. The non-transitory computer readable storage medium of claim 9, wherein a movement of the visual object in the first video sequence reflects the movement of the camera and a movement of the body, and wherein a movement of the new visual object in the second video sequence only reflects the movement of the body among the movement of the camera and the movement of the body.

13. The non-transitory computer readable storage medium of claim 9, wherein each of a plurality of images in the first video sequence including the first image and the second image only includes a part occupied by the visual object and a background part only having a first color.

14. A method for operating an electronic device, the method comprising:

obtaining, using a camera being moved according to a first state, a first video sequence including a first image and a second image subsequent to the first image, the first image and the second image obtained through the camera;

identifying a visual object in the first image corresponding to a body and the visual object in the second image, the visual object in the first video sequence having a shape corresponding to a representation of the body;

determining postures of the body independently from the movement of the camera, based on a difference between a posture of at least one visual element of the visual object in the first image corresponding to at least one joint of the body and a posture of at least one visual element of the visual object in the second image corresponding to the at least one joint;

obtaining a second video sequence indicating an appearance of a new visual object, which is viewed from another camera that is fixed according to a second state, having the determined postures; and wherein the new visual object in the second video sequence has a shape distinct from the representation of the body.

15. The method of claim 14, further comprising:

identifying the difference between the posture of the at least one visual element of the visual object in the first image and the posture of the at least one visual element of the visual object in the second image, based on a difference between an orientation of the at least one visual element of the visual object in the first image and an orientation of the at least one visual element of the visual object in the second image.

16. The method of claim 14, wherein determining the postures of the body comprises:

identifying, from among a plurality of images included in the first video sequence, the first image obtained through the camera while the camera being moved has a predetermined posture; and determining the postures of the body, based on the difference between the posture of the at least one visual element of the visual object in the identified first image and the posture of the at least one visual element of the visual object in the identified second image.

17. The method of claim 14, wherein a movement of the visual object in the first video sequence reflects the movement of the camera and a movement of the body, and wherein a movement of the new visual object in the second video sequence only reflects the movement of the body among the movement of the camera and the movement of the body.

18. The method of claim 14, wherein each of a plurality of images in the first video sequence including the first image and the second image only includes a part occupied by the visual object and a background part only having a first color.

* * * * *